United States Patent
Yano et al.

(10) Patent No.: US 12,506,157 B2
(45) Date of Patent: Dec. 23, 2025

(54) METHOD OF PRODUCING CATALYST, CATALYST, AND FUEL CELL

(71) Applicant: TOYOTA BOSHOKU KABUSHIKI KAISHA, Aichi (JP)

(72) Inventors: Hiroshi Yano, Aichi (JP); Kouta Iwasaki, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 471 days.

(21) Appl. No.: 18/133,114

(22) Filed: Apr. 11, 2023

(65) Prior Publication Data

US 2023/0387420 A1    Nov. 30, 2023

(30) Foreign Application Priority Data

May 25, 2022    (JP) ................. 2022-084917

(51) Int. Cl.
C23C 18/00    (2006.01)
C23C 18/16    (2006.01)
C23C 18/44    (2006.01)
H01M 4/88    (2006.01)
H01M 4/92    (2006.01)

(52) U.S. Cl.
CPC ....... *H01M 4/8825* (2013.01); *C23C 18/1639* (2013.01); *C23C 18/1644* (2013.01); *C23C 18/1648* (2013.01); *C23C 18/1683* (2013.01); *C23C 18/44* (2013.01); *H01M 4/926* (2013.01)

(58) Field of Classification Search
CPC . H01M 4/8825; H01M 4/926; C23C 18/1639; C23C 18/1644; C23C 18/1648; C23C 18/1683; C23C 18/44

USPC .......................................................... 502/185
See application file for complete search history.

(56) References Cited

U.S. PATENT DOCUMENTS

| | | |
|---|---|---|
| 9,258,988 B2 | 2/2016 | Willenber et al. |
| 9,859,567 B2 | 1/2018 | Kitao et al. |
| 10,749,186 B2 | 8/2020 | Inaba et al. |
| 2015/0020439 A1 | 1/2015 | Willenber et al. |
| 2016/0218370 A1 | 7/2016 | Kitao et al. |
| 2018/0047993 A1 | 2/2018 | Inaba et al. |
| 2021/0187482 A1 | 6/2021 | Yano et al. |
| 2023/0348659 A1* | 11/2023 | Adamski .............. C09D 165/02 |

FOREIGN PATENT DOCUMENTS

| | | |
|---|---|---|
| JP | 2015-000398 A | 1/2015 |
| JP | 2016-131964 A | 7/2016 |
| JP | 2017-29967 A | 2/2017 |
| JP | 2020-145154 A | 9/2020 |
| JP | 2021-94529 A | 6/2021 |
| WO | 2015/009818 A1 | 1/2015 |

\* cited by examiner

*Primary Examiner* — James E Mcdonough
(74) *Attorney, Agent, or Firm* — GREENBLUM & BERNSTEIN, P.L.C.

(57) ABSTRACT

Disclosed is a method of producing a catalyst. The method includes: dispersing, in an acid solution, a composite in which a plurality of raw material microparticles containing a noble metal is supported on a carbon support doped with a nitrogen atom and a first transition metal atom; immersing a noble metal member in the acid solution; and alternately blowing a first gas containing an oxidizing gas and a second gas containing a reducing gas into the acid solution.

16 Claims, 12 Drawing Sheets

METHOD OF PRODUCING CATALYST, CATALYST, AND FUEL CELL

CROSS-REFERENCE TO RELATED APPLICATION

This application is based on and claims the benefit of priority of Japanese Patent Application No. 2022-84917 filed on May 25, 2022, the entire contents of which are incorporated herein by reference.

BACKGROUND OF THE INVENTION

(1) Field of the Invention

The present disclosure relates to a method of producing a catalyst, a catalyst, and a fuel cell.

(2) Description of Related Art

There is disclosed a prior art in which a catalyst is activated by immersing the catalyst in an acid solution and allowing chemical species that fluctuate a potential to exist (see, for example, JP 2015-000398 A, JP 2016-131964 A, JP 2017-029967 A, and JP 2020-145154 A). As a representative example thereof, there is a method of highly activating a Pt-palladium alloy disclosed in JP 2020-145154 A. This is a method for preparing a platinum core-shell catalyst using palladium as a core metal. In any of the documents, a chemical substance that donates potential is indispensable in addition to platinum, and a main object is to optimize a core-shell form.

In addition, there is also proposed a method in which an inert gas, an oxidizing gas, and a reducing gas are circulated in an acid solution to control and activate a potential on a surface of Pt alloy particles dispersed in the solution (see WO 2015/09818 A). This document aims to optimize an alloy form.

In addition, a method of producing a highly active noble metal microparticle-supported catalyst by a simplified method is also disclosed (see JP 2021-94529 A).

However, in the prior art, since an amount of catalyst that can be treated at a time is small, it is not suitable for industrial production, and development of a new method is highly desired.

The present disclosure has been made to solve the above problems.

SUMMARY OF THE INVENTION

In a general method of synthesizing metal nanoparticles, it is chemically and physically very difficult to prepare a nanoparticle catalyst having a uniform distribution and a size of 1 nm or less. In addition, the general method of synthesizing metal nanoparticles is disadvantageous for industrial production.

When the catalyst is used as, for example, an electrode catalyst (for example, an electrode catalyst of a fuel cell), it is predicted that as the particle size is reduced, the specific surface area is increased and the catalytic ability, in other words, the catalytic activity is improved. However, when the particle size is reduced, for example, in a case where the catalyst is used in a fuel cell, metal nanoparticles as a highly dispersed and supported catalyst are degraded on a support during a power generation reaction. The metal nanoparticles are agglomerated and coarsened by Ostwald growth, and are degraded. The smaller the particle size, the larger the specific surface area and the larger a surface energy, so that a degree of degradation becomes larger. That is, the activity of the metal nanoparticles and durability thereof are in a trade-off relationship.

An object of the present disclosure is to industrially mass-produce a high-performance catalyst having both high activity and durability.

Means of the present disclosure will be described below.

[1] A method of producing a catalyst, including
dispersing, in an acid solution, a composite in which a plurality of raw material microparticles containing a noble metal is supported on a carbon support doped with a nitrogen atom and a first transition metal atom, immersing a noble metal member in the acid solution, and alternately blowing a first gas containing an oxidizing gas and a second gas containing a reducing gas into the acid solution.

In the production method of the present disclosure, a high-performance catalyst can be industrially mass-produced.

DETAILED DESCRIPTION OF PREFERRED EMBODIMENTS

Figure 1:
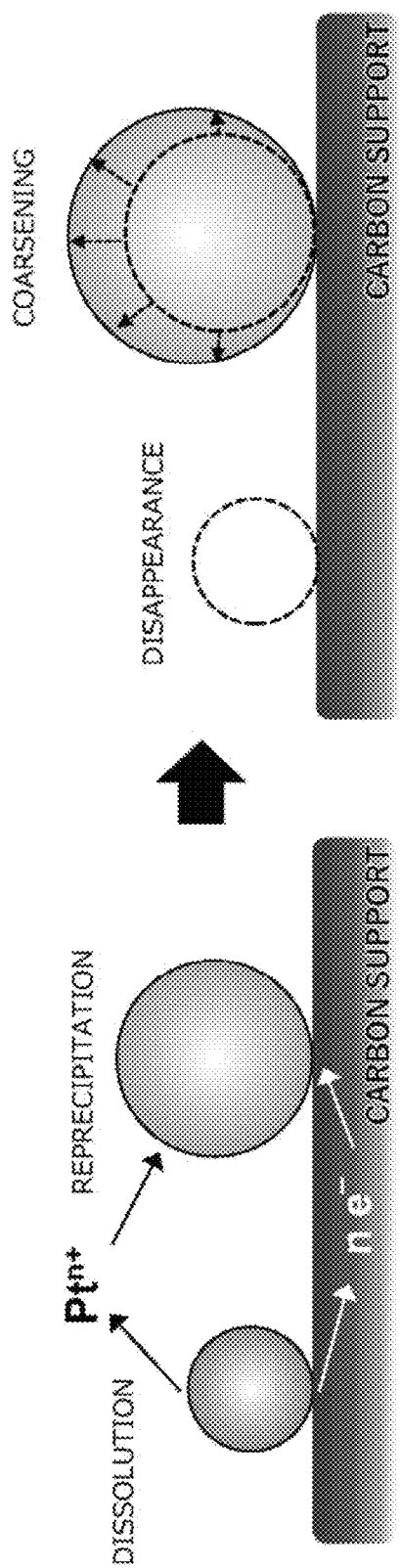
FIG. 1 is a conceptual diagram showing Ostwald growth of Pt particles.

Here, another example of the present disclosure will be described.

[2]

The method of producing a catalyst according to [1], wherein the acid solution is stirred.

[3]

The method of producing a catalyst according to [1] or [2], wherein the oxidizing gas is at least one selected from the group consisting of $O_2$, $NO_x$ (x is an integer of 1 or more and 2 or less), $N_2O$, $CO_2$, and air.

[4]

The method of producing a catalyst according to [1] or [2], wherein the reducing gas is at least one selected from the group consisting of hydrogen, ammonia, hydrocarbon, and CO.

[5]

The method of producing a catalyst according to [1] or [2], wherein at least one of the raw material microparticles is dissolved and micronized, and nascent microparticles are generated on the carbon support from metal ions generated by the dissolution.

[6]

The method of producing a catalyst according to [3], wherein a potential cycle due to a fluctuation in an open circuit potential of the noble metal member is enabled, and
 the open circuit potential is controlled by adjusting at least one or more selected from the group consisting of a concentration of the oxidizing gas in the first gas, a supply rate of the first gas, and a supply amount of the first gas per one cycle of the potential cycle.

[7]

The method of producing a catalyst according to [4], wherein a potential cycle due to a fluctuation in an open circuit potential of the noble metal member is enabled, and
 the open circuit potential is controlled by adjusting at least one or more selected from the group consisting of a concentration of the reducing gas in the second gas, a supply rate of the second gas, and a supply amount of the second gas per one cycle of the potential cycle.

[8]

The method of producing a catalyst according to [1] or [2], including a potential cycle caused by repeating a fluctuation in an open circuit potential of the noble metal member between a potential of 0 V or more and 1.0 V or less based on a standard hydrogen electrode.

[9]

A catalyst produced by
 dispersing, in an acid solution, a composite in which a plurality of raw material microparticles containing a noble metal is supported on a carbon support doped with a nitrogen atom and a first transition metal atom, immersing a noble metal member in the acid solution, and alternately blowing a first gas containing an oxidizing gas and a second gas containing a reducing gas into the acid solution.

A fuel cell comprising the catalyst according to [9].

Hereinafter, the present disclosure will be described in detail. Unless otherwise specified, the numerical value range expressed by "(value) to (value)" includes the lower limit and the upper limit of the range. For example, the expression "10 to 20" includes both a lower limit of "10" and an upper limit of "20". That is, "10 to 20" is equivalent to "10 or more and 20 or less".

The upper limits and lower limits for the numerical ranges throughout the present specification may be combined as desired.

1. Method of Producing Catalyst

In the method of producing a catalyst of the present disclosure, a composite in which a plurality of raw material microparticles containing a noble metal is supported on a carbon support doped with a nitrogen atom and a first transition metal atom is dispersed in an acid solution. In the method of producing a catalyst of the present disclosure, a noble metal member is immersed in an acid solution, and a first gas containing an oxidizing gas and a second gas containing a reducing gas are alternately blown (bubbled) into the acid solution.

(1) Acid Solution

The acid solution is not particularly limited. The acid solution is preferably at least one or more selected from the group consisting of an aqueous perchloric acid solution, an aqueous sulfuric acid solution, an aqueous nitric acid solution, and an aqueous hydrochloric acid solution. Here, at least one or more means that two or more kinds of the acid solutions mentioned here may be mixed and used.

When the acid solution is an aqueous perchloric acid solution, the concentration is preferably 0.01 M or more and 1 M or less, more preferably 0.05 M or more and 0.5 M or less, and still more preferably 0.1 M or more and 0.2 M or less from the viewpoint of accelerating size reduction of raw material microparticles.

When the acid solution is a sulfuric acid aqueous solution, the concentration is preferably 0.01 M or more and 1 M or less, more preferably 0.05 M or more and 0.5 M or less, and still more preferably 0.1 M or more and 0.2 M or less from the viewpoint of accelerating the size reduction of raw material microparticles.

When the acid solution is a nitric acid aqueous solution, the concentration is preferably 0.01 M or more and 1 M or less, more preferably 0.05 M or more and 0.5 M or less, and still more preferably 0.1 M or more and 0.2 M or less from the viewpoint of accelerating the size reduction of raw material microparticles.

When the acid solution is an aqueous hydrochloric acid solution, the concentration is preferably 0.01 M or more and 1 M or less, more preferably 0.05 M or more and M or less, and still more preferably 0.1 M or more and M or less from the viewpoint of accelerating the size reduction of raw material microparticles.

(2) Composite

In the composite, a plurality of raw material microparticles containing a noble metal is supported on the carbon support doped with the nitrogen atom and the first transition metal atom. The raw material microparticles mean microparticles containing a noble metal before treatment by a potential cycle described later.

(2.1) Carbon Support

The carbon support may be referred to as a "noble metal-free carbon catalyst", a "carbon alloy", or the like. The presence of the nitrogen atom and the first transition metal atom in the carbon support serves as a starting point for forming ultrafine particles described later. On the other hand, when there are no nitrogen atoms and no first transition metal atoms, ultrafine particles are not formed.

The first transition metal atom is at least one selected from the group consisting of scandium (Sc), titanium (Ti), vanadium (V), Cr (chromium), manganese (Mn), iron (Fe), cobalt (Co), nickel (Ni), and copper (Cu).

A doping amount of nitrogen atoms is not particularly limited. The doping amount of nitrogen atoms is preferably by mass or more and 20% by mass or less, more preferably 0.5% by mass or more and 15% by mass or less, and still more preferably 1% by mass or more and 10% by mass or less when the total amount of the carbon support is 100% by mass from the viewpoint of accelerating the size reduction of the raw material microparticles by the application of a voltage having a potential cycle.

The doping amount of the first transition metal atoms is not particularly limited. The doping amount of the first transition metal atoms is preferably 0.1% by mass or more and 20% by mass or less, more preferably 0.5% by mass or more and 15% by mass or less, and still more preferably 1% by mass or more and 10% by mass or less when the total amount of the carbon support is 100% by mass from the viewpoint of accelerating the size reduction of the raw material microparticles by the application of the voltage having the potential cycle.

A nitrogen adsorption specific surface area of the carbon support is not particularly limited. The nitrogen adsorption specific surface area of the carbon support is preferably 50 $m^2g^{-1}$ or more and 2000 $m^2g^{-1}$ or less, and more preferably 150 $m^2g^{-1}$ or more and 800 $m^2g^{-1}$ or less from the viewpoint of increasing the supporting amount of the raw material microparticles.

(2.2) Plurality of Raw Material Microparticles Containing Noble Metal

The noble metal is not particularly limited. As the noble metal, it is preferable to use at least one selected from the group consisting of platinum (Pt), palladium (Pd), rhodium (Rh), gold (Au), silver (Ag), iridium (Ir), and ruthenium (Ru). Among these noble metals, from the viewpoint of catalyst performance, at least one selected from the group consisting of Pt, Rh, Pd, Ir, and Ru is more preferable, and at least one selected from the group consisting of Pt and Pd is still more preferable.

The content of the noble metal in the raw material microparticles is not particularly limited, but is preferably 90% by mass or more, more preferably 95% by mass or more, and still more preferably 98% by mass or more. The content of the noble metal may be 100% by mass.

The number of raw material microparticles supported on the carbon support is not particularly limited as long as it is two or more (plural).

An average particle size of the raw material microparticles is not particularly limited. The average particle size of the raw material microparticles is preferably 0.8 nm or more and 1.5 nm or less, more preferably 1.1 nm or more and 1.4 nm or less, and still more preferably 1.2 nm or more and 1.3 nm or less from the viewpoint of ensuring high activity.

The average particle size can be determined by the following method (method of determining the average particle size). The composite is observed with a transmission electron microscope (TEM). A TEM photograph is printed out on a paper, and a total of 300 particles are randomly measured from an image of several fields of view (3 fields of view to 5 fields of view) by regarding the raw material microparticle (black circular image) as spherical and regarding the size across the raw material microparticle as a diameter. An average of the diameters of 300 particles is defined as the average particle size.

The raw material microparticles preferably have a standard deviation value of 0% or more and 10% or less with respect to an average particle size value. The standard deviation value is calculated by creating a distribution map from 300 particle sizes.

(2.3) Method of Producing Composite

A method of producing the composite is not particularly limited. An example of the method of producing a composite will be described.

A preferred example of the method of producing a composite includes a step of mixing a noble metal salt, an alcohol having 1 to 5 carbon atoms, and a support to form a mixture, and a heating step of heating the mixture at 150° C. or higher and 800° C. or lower to produce a catalyst.

(2.3.1) Noble Metal Salt

The noble metal contained in the noble metal salt is not particularly limited, but it is preferable to use at least one selected from the group consisting of platinum (Pt), palladium (Pd), rhodium (Rh), gold (Au), silver (Ag), iridium (Ir), and ruthenium (Ru). Among these noble metals, from the viewpoint of the catalyst performance, at least one selected from the group consisting of Pt, Rh, Pd, Ir, and Ru is more preferable, and at least one selected from the group consisting of Pt and Pd is still more preferable.

As the noble metal salt, at least one selected from the group consisting of hexachloroplatinum (IV) acid hexahydrate ($H_2PtCl_6 \cdot 6H_2O$), tetraamminedichloroplatinum (Pt$(NH_3)_4Cl_2 \cdot xH_2O$), platinum (IV) bromide (PtBr$_4$), and bis (acetylacetonato)platinum (II) ($[Pt(C_5H_7O_2)_2]$) can be suitably used.

(2.3.2) Alcohol Having 1 to 5 Carbon Atoms

As the alcohol having 1 to 5 carbon atoms, at least one selected from the group consisting of methanol, ethanol, propanol, isopropyl alcohol, 1-butanol, 2-butanol, t-butyl alcohol, 1-pentanol, and 3-pentanol can be suitably used. Among them, ethanol is preferable from the viewpoint of reducing environmental load.

An amount ratio of the alcohol and the noble metal salt is not particularly limited. The concentration of the noble metal salt in an alcohol solution in which the noble metal salt is dissolved is not particularly limited. The concentration of the noble metal salt is preferably 0.1 $molL^{-1}$ or more and 50 $molL^{-1}$ or less, more preferably 5 $molL^{-1}$ or more and 40 $molL^{-1}$ or less, and still more preferably 10 $molL^{-1}$ or more and 30 $molL^{-1}$ or less from the viewpoint of obtaining highly active noble metal raw material microparticles having an average particle size of nm or more and 1.5 nm or less and being uniform in size.

(2.3.3) Support

As the support, the above-described carbon support is used.

(2.3.4) Mixing Ratio of Support and Alcohol

A mixing ratio of the support and the alcohol is not particularly limited. From the viewpoint of fully blending the support and the alcohol and obtaining highly active noble metal raw material microparticles having an average particle size of 0.8 nm or more and 1.5 nm or less and being uniform in size, the support is mixed at a ratio of preferably 2 mg or more and 200 mg or less, more preferably mg or more and 100 mg or less, and still more preferably mg or more and 80 mg or less with respect to 1 mL of the alcohol.

(2.3.5) Mixing

A mixing method is not particularly limited. Pulverizing and mixing may be performed using a mortar and a pestle, or pulverizing and mixing may be performed using a dry pulverizer such as a ball mill, a vibration mill, a hammer mill, a roll mill, or a jet mill. Mixing may be performed using a mixer such as a ribbon blender, a Henschel mixer, or a V-shaped blender.

A mixing time is not particularly limited. The mixing is preferably performed until the alcohol volatilizes so that the mixture dries.

(2.3.6) Heating

The heating temperature is 150° C. or higher and 800° C. or lower, preferably 150° C. or higher and 400° C. or lower, and more preferably 150° C. or higher and 250° C. or lower from the viewpoint of obtaining highly active noble metal microparticles having a particle size of 0.8 nm or more and 1.5 nm or less and being uniform in size.

The heating is preferably performed in an inert gas atmosphere. As the inert gas, a rare gas such as an argon gas or a nitrogen gas can be suitably used. The heating may be performed in air.

(2.4) Supporting Amount of Noble Metal in Composite

The supporting amount of the noble metal in the composite is not particularly limited, and a necessary amount may be appropriately supported according to a target design and the like. The supporting amount of the noble metal is preferably 5 parts by mass or more and 70 parts by mass or less, and more preferably 10 parts by mass or more and 50 parts by mass or less with respect to 100 parts by mass of the carbon support in terms of metal from the viewpoint of the catalyst performance and cost.

(3) Quantity Ratio Between Acid Solution and Composite

The quantity ratio between the acid solution and the composite is not particularly limited. From the viewpoint of dispersing the composite in the acid solution well to accelerate the size reduction of the raw material microparticles, the composite is mixed at a ratio of preferably 0.05 mg or more and 5 mg or less, more preferably 0.1 mg or more and 2 mg or less, and still more preferably 0.5 mg or more and 1 mg or less with respect to 1 mL of the acid solution.

(4) Noble Metal Member

The noble metal used for the noble metal member is not particularly limited. As the noble metal, it is preferable to use at least one selected from the group consisting of platinum (Pt), palladium (Pd), rhodium (Rh), gold (Au), silver (Ag), iridium (Ir), and ruthenium (Ru). Among these noble metals, at least one selected from the group consisting of Pt, Rh, Pd, Ir, and Ru is more preferable, and Pt is still more preferable from the viewpoint of accelerating the size reduction of the raw material microparticles.

The shape and size of the noble metal member are not particularly limited. The shape of the noble metal member is preferably a shape selected from the group consisting of a mesh shape, a punching metal shape, a lattice shape, an expanded metal shape, a fiber shape, and a sponge shape from the viewpoint of increasing a contact area with the raw material microparticles by increasing the surface area. An opening rate of the noble metal member is not particularly limited. The opening rate is preferably 1% or more and 99% or less, more preferably 10% or more and 80% or less, and still more preferably 30% or more and 50% or less from the viewpoint of suppressing hindrance of the flow of the stirred acid solution.

The noble metal member is preferably entirely immersed in the acid solution. The noble metal member may be partially exposed from the acid solution.

(5) First Gas Containing Oxidizing Gas

The oxidizing gas is not particularly limited. The oxidizing gas is preferably at least one selected from the group consisting of $O_2$, $NO_x$ (x is an integer of 1 or more and 2 or less), $N_2O$, $CO_2$, and air from the viewpoint of easily controlling a surface potential (open circuit potential) of the noble metal member to accelerate the size reduction of the raw material microparticles.

The concentration of the oxidizing gas in the first gas is not particularly limited. The concentration of the oxidizing gas is preferably 1 vol % or more and 100 vol % or less, more preferably 30 vol % or more and 100 vol % or less, and still more preferably 50 vol % or more and 100 vol % or less from the viewpoint of controlling the surface potential (open circuit potential) of the noble metal member to accelerate the size reduction of the raw material microparticles.

The open circuit potential of the noble metal member can be controlled by adjusting at least one or more selected from the group consisting of the concentration of the oxidizing gas in the first gas, a supply rate of the first gas, and a supply amount of the first gas per one cycle of the potential cycle. Specifically, by adjusting these, a reached potential at the open circuit potential of the noble metal member and the speed until reaching the reached potential can be controlled.

The concentration of the oxidizing gas in the first gas, the supply rate (blowing rate) of the first gas, and the supply amount of the first gas per one cycle of the potential cycle are desirably adjusted so that the surface potential (open circuit potential) of the noble metal member is preferably 0.8 V or more and 1.2 V or less, and more preferably 0.9 V or more and 1.1 V or less based on a standard hydrogen electrode (vs. RHE).

The first gas may contain a gas other than the oxidizing gas. The gas other than the oxidizing gas is not particularly limited, and examples thereof include argon and nitrogen.

(6) Second Gas Containing Reducing Gas

The reducing gas is not particularly limited. The reducing gas is preferably at least one selected from the group consisting of hydrogen, ammonia, hydrocarbon, and CO from the viewpoint of controlling the open circuit potential of the noble metal member to accelerate the size reduction of the raw material microparticles.

The concentration of the reducing gas in the second gas is not particularly limited. The concentration of the reducing gas is preferably 0.01 vol % or more and 100 vol % or less, more preferably 0.05 vol % or more and 4 vol % or less, and still more preferably 0.1 vol % or more and 1 vol % or less from the viewpoint of controlling the surface potential (open circuit potential) of the noble metal member to accelerate the size reduction of the raw material microparticles.

The open circuit potential of the noble metal member can be controlled by adjusting at least one or more selected from the group consisting of the concentration of the reducing gas in the second gas, a supply rate of the second gas, and a supply amount of the second gas per one cycle of the potential cycle. Specifically, by adjusting these, a reached potential at the open circuit potential of the noble metal member and the speed until reaching the reached potential can be controlled.

The concentration of the reducing gas in the second gas, the supply rate (blowing rate) of the second gas, and the supply amount of the second gas per one cycle of the potential cycle are desirably adjusted so that the surface potential (open circuit potential) of the noble metal member is preferably 0.0 V or more and 0.7 V or less, and more preferably 0.5 V or more and 0.7 V or less based on the standard hydrogen electrode (vs. RHE).

The second gas may contain a gas other than the reducing gas. The gas other than the reducing gas is not particularly limited, and examples thereof include argon and nitrogen.

(7) Potential Cycle

The open circuit potential of the noble metal member preferably has a potential cycle that repeats between a potential of 0 V or more and 1.0 V or less based on the standard hydrogen electrode from the viewpoint of accelerating the size reduction of the raw material microparticles. The potential cycle is generated by alternately blowing the first gas containing the oxidizing gas and the second gas containing the reducing gas. That is, the surface potential of the noble metal member is shifted to a noble potential side by blowing the first gas containing the oxidizing gas, and is shifted to a less noble potential side by blowing the second gas containing the reducing gas; therefore, the potential cycle occurs by alternately blowing these gases.

The potential cycle includes repetition of a low potential and a high potential.

The low potential is preferably 0.0 V or more and 0.7 V or less, and more preferably 0.5 V or more and 0.7 V or less based on the standard hydrogen electrode.

The high potential is preferably 0.8 V or more and 1.2 V or less, and more preferably 0.9 V or more and 1.1 V or less based on the standard hydrogen electrode.

For example, based on the standard hydrogen electrode, a potential cycle between 0.0 V and 1.0 V is preferable, and a potential cycle between 0.6 V and 1.0 V is more preferable.

When the low potential and the high potential are set to these preferable ranges, the raw material microparticles are dissolved to form subnano-sized ultrafine particles, and nascent microparticles also become subnano-sized ultrafine particles.

A waveform of the potential cycle is not particularly limited. The waveform may be, for example, a pulse wave, a periodic waveform, a rectangular wave, a triangular wave, a sine wave, or the like.

The number of potential cycles is not particularly limited. The number of potential cycles is preferably 1 or more and 100 or less, more preferably 3 or more and 50 or less, and still more preferably 5 or more and 20 or less from the viewpoint of forming subnano-sized ultrafine particles and improving the catalyst performance.

(8) Stirring of Acid Solution

In the method of producing a catalyst of the present disclosure, it is preferable to stir an acid solution from the viewpoint of obtaining a high-performance catalyst by promoting contact between the noble metal member (platinum mesh or the like) and raw material microparticles. The stirring method is not particularly limited, and a known stirring method can be employed.

When the acid solution is stirred, the raw material microparticles (microparticles containing noble metal) supported on the composite easily come into contact with the noble metal member (platinum mesh or the like). When the raw material microparticles come into contact with the noble metal member, the potential of the surface of the raw material microparticles (catalyst surface) becomes the same as the open circuit potential of the noble metal member. Thus, by repeating the introduction of the oxidizing gas and the reducing gas for a certain period of time, the raw material microparticles are treated using the potential cycle. This treatment is equivalent to a treatment using the potential cycle performed by an external control device for an electroded catalyst.

(9) Estimated Mechanism of Formation of Microparticles in Sub-Nano Region (1 nm or Less)

In the production method of the present disclosure, it is preferable that at least one of the raw material microparticles is dissolved and micronized, and nascent microparticles are generated on the carbon support from metal ions generated by the dissolution.

Here, an estimated mechanism by which microparticles in a sub-nano region (1 nm or less) are formed by this preferred production method will be described with reference to FIGS. 1 and 2. Pt particles are exemplified as microparticles containing a noble metal.

FIG. 1 shows a case where a carbon support doped with neither the nitrogen atom nor the first transition metal atom is used. In the left figure of FIG. 1, a composite in which Pt particles (raw material microparticles (for example, microparticles having an average particle size of 0.8 nm or more and 1.5 nm or less)) are supported is shown. When this composite is treated using the potential cycle, the Pt particles of 1.4 nm and to 2 nm, for example, are dissolved to form $Pt^{n+}$, and $Pt^{n+}$ is reprecipitated on the adjacent Pt particles and coarsened as shown in the right figure. That is, when the carbon support doped with neither the nitrogen atom nor the first transition metal atom is used, the Pt particles are usually coarsened by Ostwald ripening.

Figure 2:
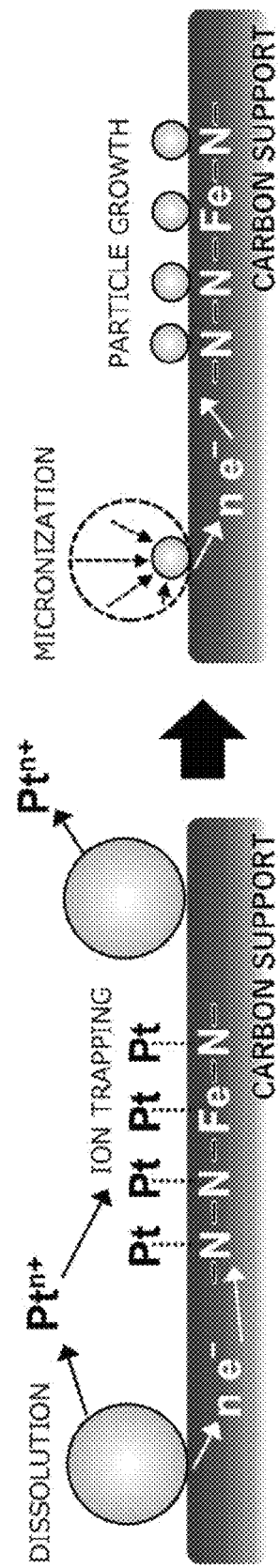
FIG. 2 is a conceptual diagram showing a mechanism of forming subnano-sized Pt particles.

FIG. 2 shows a case of using a carbon support doped with the nitrogen atom and the first transition metal atom. The left figure of FIG. 2 shows a composite in which the Pt particles (raw material microparticles) are supported. When this composite is treated using the potential cycle, the Pt particles are dissolved to form $Pt^{n+}$. The dissolved $Pt^{n+}$ is trapped by a nitrogen atom (N atom) or an Fe atom (an example of the first transition metal atom) on the support before reaching the adjacent Pt particles to form new Pt particles. At the same time, the remaining Pt particles also become small, and both the new particles and the remaining particles become subnano-sized (ultrafine particles), and catalysts exhibiting high specific surface area and high activity is presumed to be obtained.

(10) Advantages of Method of Producing Catalyst

In the production method of the present disclosure, a high-performance catalyst can be industrially mass-produced.

It is presumed that, in the method of producing a catalyst of the present disclosure, the noble metal member is immersed in the acid solution, the potential of the noble metal member is controlled only by a gas to be blown, and at the same time, the catalyst in the acid solution comes into contact with the noble metal member by stirring or the like, thereby providing the potential. It is considered that this action mechanism eliminates the bias of the potential provision due to the gas concentration in the solution and nonuniformity of the catalyst, and the high-performance catalyst can be industrially mass-produced.

In the conventional production method developed by the present inventors, a prepared catalyst is formed into an electrode, immersed in an acid solution, and connected to a potential controller, and the potential applied to the catalyst is forcibly controlled. In this production method, an amount that can be processed at a time is limited. Moreover, in this production method, it is difficult to collect as a catalyst powder after the treatment, and it is difficult to apply the method to industrial production. Meanwhile in the production method of the present disclosure, the open circuit potential can be controlled by a very simple method of placing the noble metal member in the acid solution in a container, introducing the catalyst (composite), preferably stirring, and only introducing a gas. Thus, potential control is substantially performed, and the production method is suitable for mass production. A scale of a production volume depends only on the size of the container containing the solution. Therefore, development on an industrial scale is easy.

In the method of producing a catalyst of the present disclosure, the size of metal microparticles (raw material microparticles) originally supported can be further reduced, and a high-performance catalyst can be mass-produced. That is, in the method of producing a catalyst of the present disclosure, the raw material microparticles are dissolved by the potential cycle treatment, catalyst particles having a subnano size smaller than the original size are formed, so that a catalyst exhibiting high specific surface area and high activity can be produced in a large amount in a small number of steps at a time.

2. Catalyst

The catalyst is produced by dispersing, in the acid solution, the composite in which a plurality of raw material microparticles containing a noble metal is supported on the carbon support doped with the nitrogen atom and the first transition metal atom, immersing the noble metal member in the acid solution, and alternately blowing the first gas containing the oxidizing gas and the second gas containing the reducing gas into the acid solution. This catalyst contains subnanoparticles (particles having a particle size of more than 0.0 nm and less than 0.8 nm) and has high performance.

In the description of the catalyst in this column, the description in the column of "1. Method of producing catalyst" is applied as it is regarding "acid solution", "carbon support", "composite", "noble metal member", "first gas containing oxidizing gas", "second gas containing reducing gas", and the like, and the description thereof is omitted. That is, the description in the item of "1. Method of producing catalyst" is applied as it is.

In the catalyst, a plurality of microparticles containing a noble metal is supported on the carbon support doped with the nitrogen atom and the first transition metal atom. The microparticles contain subnanoparticles.

The noble metal is not particularly limited. As the noble metal, it is preferable to use at least one selected from the group consisting of platinum (Pt), palladium (Pd), rhodium (Rh), gold (Au), silver (Ag), iridium (Ir), and ruthenium (Ru). Among these noble metals, from the viewpoint of catalyst performance, at least one selected from the group consisting of Pt, Rh, Pd, Ir, and Ru is more preferable, and at least one selected from the group consisting of Pt and Pd is still more preferable.

The content of the noble metal in the microparticles is not particularly limited, but is preferably 90% by mass or more, more preferably 95% by mass or more, and still more preferably 98% by mass or more. The content of the noble metal may be 100% by mass.

The number of microparticles supported on the carbon support is not particularly limited as long as it is two or more (plural).

As described above, the microparticles include subnanoparticles. The presence of the subnanoparticles can be confirmed by observing the catalyst with the transmission electron microscope (TEM).

Specifically, the catalyst is observed with the transmission electron microscope (TEM). A TEM photograph is printed out on a paper, and a total of 300 particles are randomly measured from an image of several fields of view (3 fields of view to 5 fields of view) by regarding the microparticle of the noble metal (black circular image) as spherical and regarding the size across the microparticle as the diameter. If particles of more than 0.0 nm and less than 0.8 nm are present in the total of 300 particles, it is determined that the microparticles include particles of more than 0.0 nm and less than 0.8 nm. The particles of more than 0.0 nm and less than 0.8 nm are preferably particles of 0.2 nm or more and less than 0.8 nm, and more preferably particles of 0.3 nm or more and 0.7 nm or less.

An average particle size of the microparticles is not particularly limited. The average particle size of the microparticles is preferably 0.2 nm or more and 1.5 nm or less from the viewpoint of ensuring high activity.

The average particle size can be determined by the following method (method of determining the average particle size). The synthesized catalyst is observed with the transmission electron microscope (TEM). A TEM photograph is printed out on a paper, and a total of 300 particles are randomly measured from an image of several fields of view (3 fields of view to 5 fields of view) by regarding the microparticle (black circular image) as spherical and regarding the size across the microparticle as the diameter. An average of the diameters of 300 particles is defined as the average particle size.

It is preferable that the microparticles have at least one peak within a range from more than 0.0 nm to less than 0.8 nm in the particle size distribution map. The distribution map is created from the particle sizes of 300 particles.

The supporting amount of the noble metal is not particularly limited, and a necessary amount may be appropriately supported according to a target design and the like. The supporting amount of the noble metal is preferably 5 parts by mass or more and 70 parts by mass or less, and more preferably 10 parts by mass or more and 50 parts by mass or less with respect to 100 parts by mass of the carbon support in terms of metal from the viewpoint of the catalyst performance and cost.

The above-described catalyst can be suitably applied to a fuel cell. The potential cycle described in "1. Method of producing catalyst" corresponds to an operating potential range in the fuel cell. In particular, when considering use for a fuel cell vehicle (FCV), it corresponds to a potential fluctuation range at the time of load fluctuation of the FCV. That is, by mounting the catalyst of the present disclosure on a fuel cell, highly active subnanoparticles are self-formed in accordance with operation, and the activity continues indefinitely, that is, high durability is exhibited. As a result, an innovative catalyst that realizes both improvement in activity and maintenance of durability, which have been issues of fuel cells, can be obtained.

The catalyst of the present disclosure is also applicable to batteries, sensors, electrolysis, and the like.

This catalyst is a catalyst containing highly active subnanoparticles even in an initial state, and when the catalyst is mounted on a fuel cell, highly active subnanoparticles are self-formed in accordance with operation, so that the activity continues indefinitely.

3. Fuel Cell

The fuel cell includes a catalyst. Examples of the fuel cell include a polymer electrolyte fuel cell (PEFC), a phosphoric acid fuel cell (PAFC), a molten carbonate fuel cell (MCFC), an alkaline electrolyte fuel cell (AFC), and a direct fuel cell (DFC). The fuel cell of the present disclosure has high performance because the catalyst contains subnanoparticles.

Figure 3:
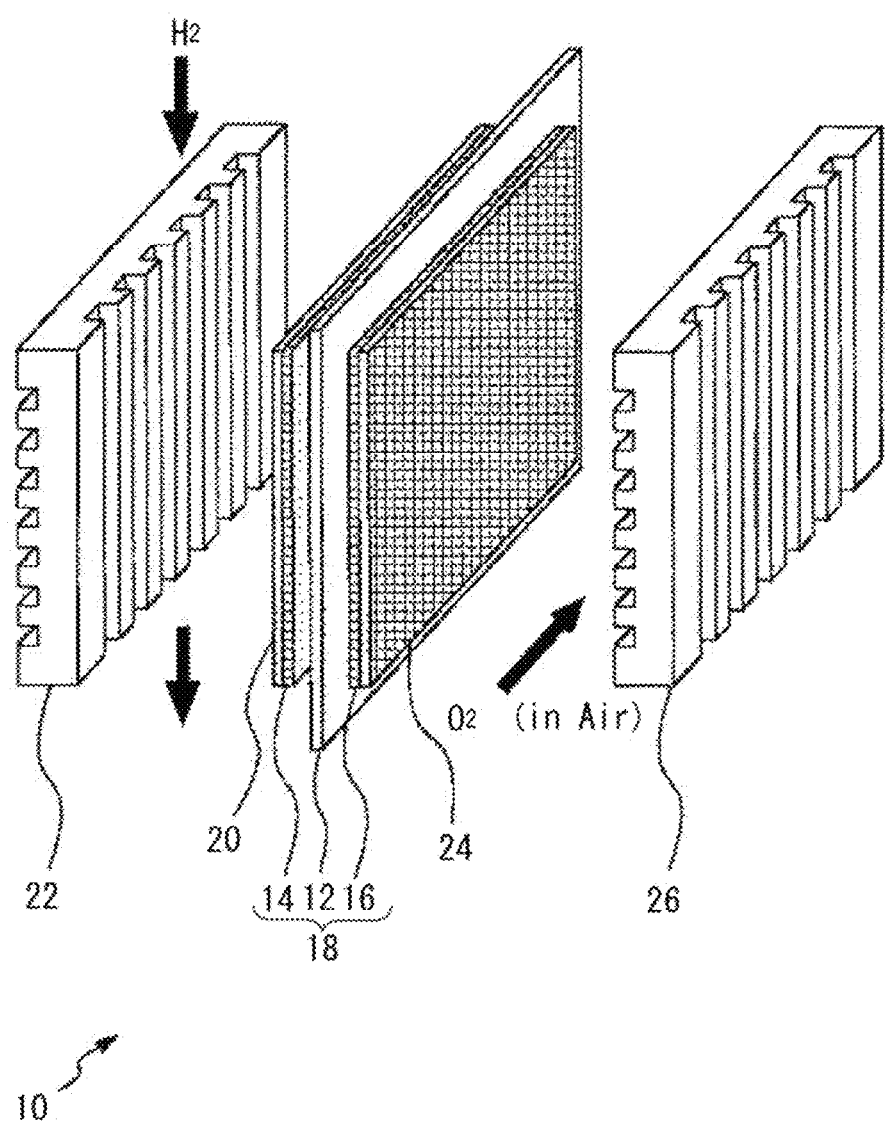
FIG. 3 is a schematic diagram of an example of a polymer electrolyte fuel cell.

A configuration example of the fuel cell will be described. A fuel cell 10 is a polymer electrolyte fuel cell as a preferred example. As shown in FIG. 3, the fuel cell 10 includes a solid polymer electrolyte membrane 12 as an electrolyte membrane. The solid polymer electrolyte membrane 12 is formed of, for example, a perfluorosulfonic acid resin. On both sides of the solid polymer electrolyte membrane 12, an anode electrode 14 and a cathode electrode 16 are provided so as to sandwich the solid polymer electrolyte membrane. The solid polymer electrolyte membrane 12 and a pair of the anode electrode 14 and the cathode electrode 16 sandwiching the solid polymer electrolyte membrane 12 constitutes a membrane electrode assembly 18.

A gas diffusion layer 20 is provided outside the anode electrode 14. The gas diffusion layer 20 is formed of a porous material such as carbon paper, carbon cloth, or a metal porous body, and has a function of uniformly diffusing gas supplied from the separator 22 side into the anode electrode 14. Similarly, a gas diffusion layer 24 is provided outside the cathode electrode 16. The gas diffusion layer 24 has a function of uniformly diffusing the gas supplied from a separator 26 side into the cathode electrode 16. Although only one set of the membrane electrode assembly 18, the gas diffusion layers 20 and 24, and the separators 22 and 26 configured as described above is shown in this figure, the actual fuel cell 10 may have a stack structure in which a plurality of the membrane electrode assemblies 18 and the gas diffusion layers 20 and 24 are stacked with the separators 22 and 26 interposed therebetween.

EXAMPLES

The present disclosure will be described more specifically by way of examples. In the following description, "%" for gas means vol %.

1. Experimental Apparatus

Figure 4:
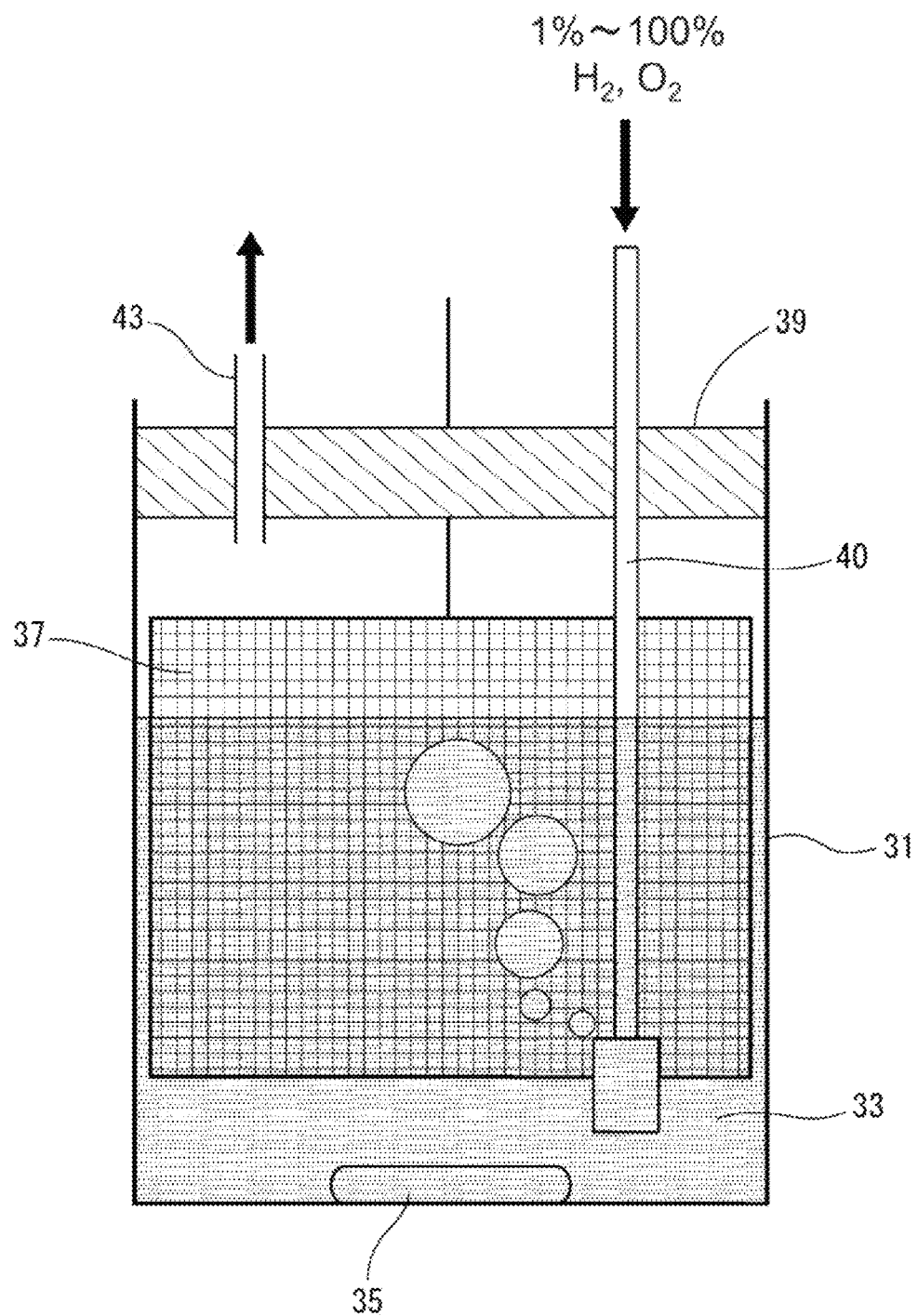
FIG. 4 is a schematic diagram of an open circuit potential processing cell of an example of a catalyst production apparatus.

FIG. 4 is a schematic diagram of a cell (experimental apparatus) used in the production method (open circuit potential control method) of the present disclosure. An aqueous perchloric acid solution 33 (0.1 M $HClO_4$ aqueous solution) as an acid solution was put in a beaker 31. A rotor 35 (stirrer) for stirring was set in the beaker 31. A platinum mesh 37 has a substantially rectangular shape as a whole. The platinum mesh 37 was installed so that about ¾ of the lower side was immersed in the liquid and about ¼ of the upper side was exposed to a gas phase. A lower end of the platinum mesh 37 (Pt mesh) was slightly lifted from a bottom surface of the beaker 31 so as not to interfere with the movement of the rotor 35. A width of the platinum mesh 37 was made slightly smaller than an inner diameter of the beaker 31. The platinum mesh 37 was fixed to a lid 39 via a lead wire. A gas supply pipe 40 was used to blow gas into the aqueous perchloric acid solution 33. The gas was blown in a state where a tip of the gas supply pipe 40 was immersed in the aqueous perchloric acid solution 33. The lid 39 was also provided with an exhaust port 43. After the catalyst was put in, the aqueous perchloric acid solution 33 was stirred by the rotor 35 to circulate the gas in the aqueous perchloric acid solution 33 (bubbling was performed).

2. Synthesis of Composite in which Plurality of Raw Material Microparticles Containing Noble Metal is Supported on Carbon Support As the carbon support, a carbon alloy (N—Fe—C, Precious metal free carbon (PMF)) in which a nitrogen atom (N) and an iron atom (Fe) were doped in the carbon skeleton of mesoporous carbon was used. The specific surface area is 560 $m^2g^{-1}$.

The composite was synthesized as follows. That is, hexachloroplatinum (IV) acid hexahydrate (($H^2PtCl_6·6H_2O$): Kanto Kagaku, 98.5%) was collected in a 60 mg beaker, and 1 mL of ethanol ($C_2H_5OH$) was added thereto for dissolution. After 45 mg of the carbon support was collected in a mortar, an ethanol solution in which the Pt salt was dissolved was added thereto, and the mixture was stirred and mixed until ethanol was volatilized and dried. The resulting powder was transferred to a ceramic boat, and subjected to heat treatment at 200° C. for 2 hours in an argon (Ar) atmosphere in a tubular furnace. When the temperature was lowered to room temperature, the resulting product was taken out from the tubular furnace and used as a catalyst.

3. Experiment 1 (Relationship Between Potential Fluctuation and Time During 100% $H_2$ Gas and 100% $O_2$ Gas Bubbling)

Figure 5:
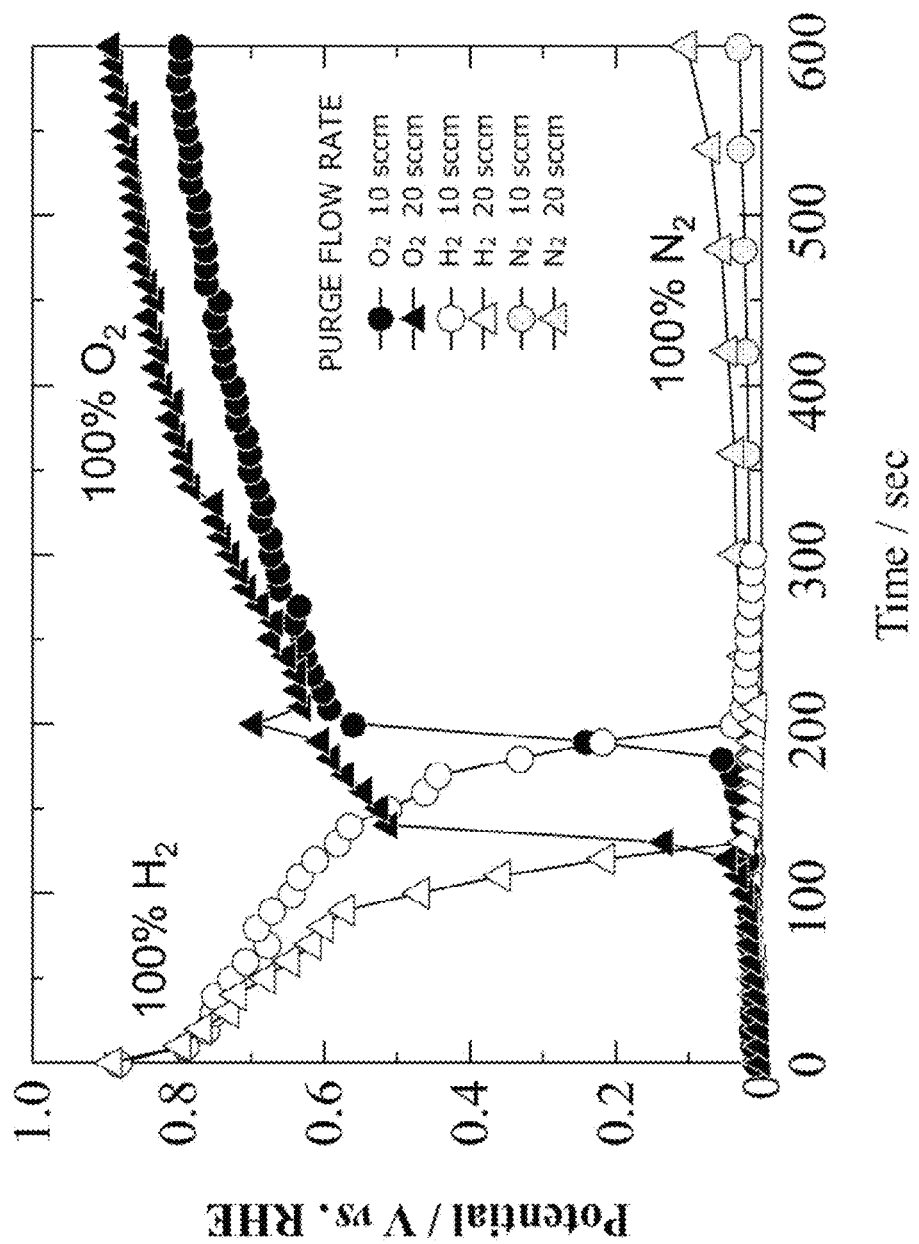
FIG. 5 is a graph showing a relationship between time and potential fluctuation during $H_2$ gas and $O_2$ gas bubbling.

FIG. 5 illustrates a result of measuring the open circuit potential of the Pt mesh by adding a reference electrode (V vs RHE) to the cell illustrated in FIG. 4, and introducing a 100% hydrogen gas or 100% oxygen gas.

The potential around 0.9 V in the presence of oxygen decreased immediately after hydrogen gas introduction and reached 0 V. The arrival speed was dependent on the gas supply rate. When the flow rate was 20 sccm, the voltage reached 0 V in less than 2 minutes. When the flow rate was 10 sccm, the voltage reached 0 V more slowly than when the flow rate was 20 sccm. Thus, the arrival speed reaching 0 V depended on the gas supply rate.

On the other hand, the potential at 0 V under hydrogen saturation increased after oxygen gas introduction, and reached around 0.8 V to 0.9 V again. Also for the oxygen gas introduction, the flow rate of 20 sccm took less time to reach 0.8 V to 0.9 V than the flow rate of 10 sccm. Thus, the arrival speed reaching 0.8 V to 0.9 V depended on the gas supply rate.

It was found that even when Ar as an inert gas was introduced from hydrogen saturation (0 V), the increase in the potential was slight and the change was poor.

4. Experiment 2 (Relationship Between Potential Fluctuation and Time During 3% $H_2$ (Ar Balance) and 100% $O_2$ Bubbling)

Figure 6:
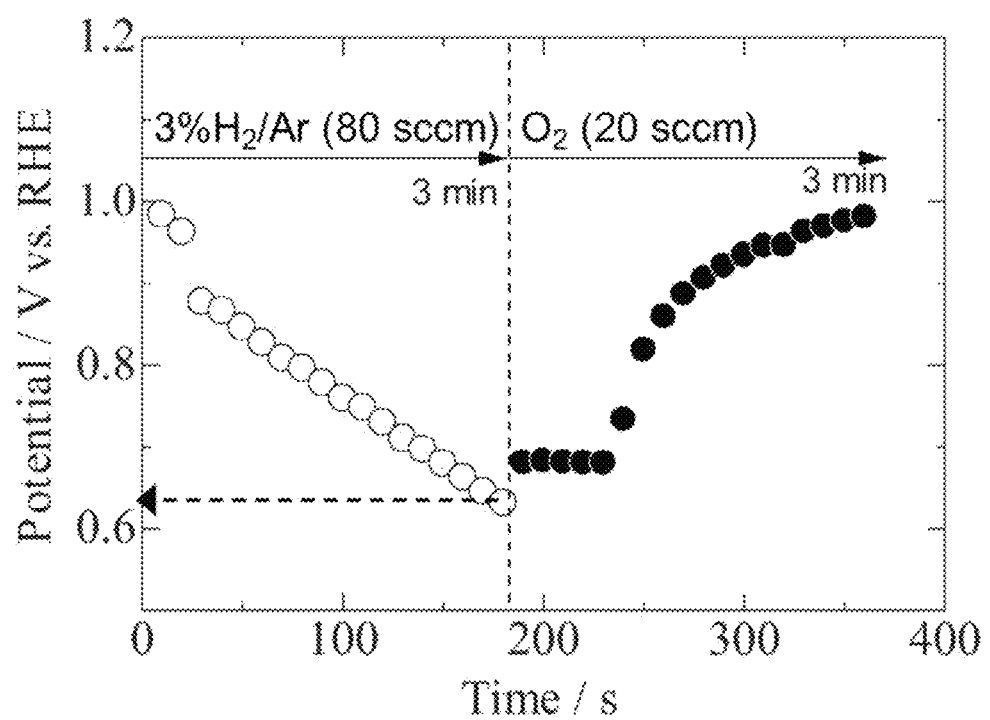
FIG. 6 is a graph showing the relationship between the time and the potential fluctuation during $H_2$ gas and $O_2$ gas bubbling.

FIG. 6 illustrates a result of examining a time until the potential returns to 1.0 V since a cell is set in the same manner as in Experiment 1, a 3% hydrogen gas (Ar balance) is introduced at 80 sccm for 3 minutes, and then gas is switched to a 100% oxygen gas and introduced at 20 sccm. When the 3% hydrogen gas (Ar balance) was introduced at 80 sccm for 3 minutes, the potential shift changed from 1.00 V to 0.63 V. Thereafter, when the gas was switched to the 100% oxygen gas and introduced at 20 sccm, a time until the potential returned to 1.0 V, that is, until the potential shift changed from 0.63 V to 1.00 V was 3 minutes.

Figure 7:
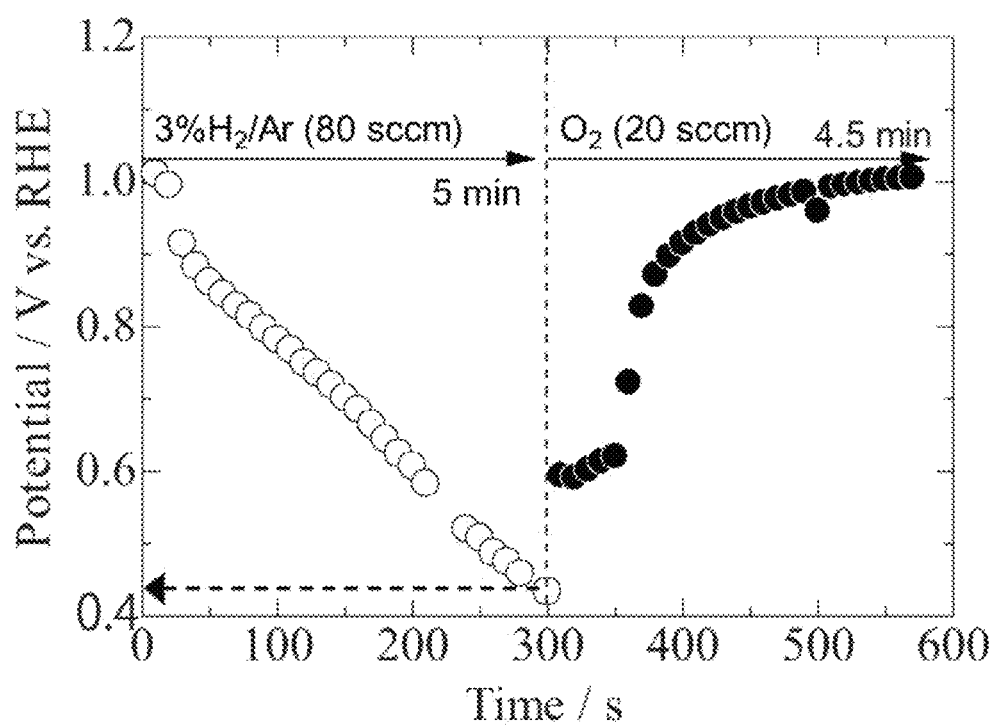
FIG. 7 is a graph showing the relationship between the time and the potential fluctuation during $H_2$ gas and $O_2$ gas bubbling.

FIG. 7 illustrates a result of examining a time until the potential returns to 1.0 V since the cell is set in the same manner as in Experiment 1, the 3% hydrogen gas (Ar balance) is introduced at 80 sccm for 5 minutes, and then gas is switched to the 100% oxygen gas and introduced at 20 sccm. When the 3% hydrogen gas (Ar balance) was introduced at 80 sccm for 5 minutes, the potential shift changed from 1.00 V to 0.44 V. Thereafter, when the gas was switched to the 100% oxygen gas and introduced at 20 sccm, a time until the potential returned to 1.0 V, that is, until the potential shift changed from 0.44 V to 1.00 V was 4.5 minutes.

In Experiment 2, it was found that the longer the introduction time of 3% $H_2$, the more the potential shifted to a less noble side.

In this experiment, the time required for returning to 1.0 V when switching to oxygen was longer in the case of FIG. 7 than in the case of FIG. 6. This was found to be because the shift to the less noble side by the 3% hydrogen gas was 0.63 V in FIG. 6 and 0.44 V in FIG. 7, and thus the shift to the less noble side was larger in FIG. 7.

5. Experiment 3 (Relationship Among Gas Supply Amount, Potential Fluctuation, and Time)

Figure 8:
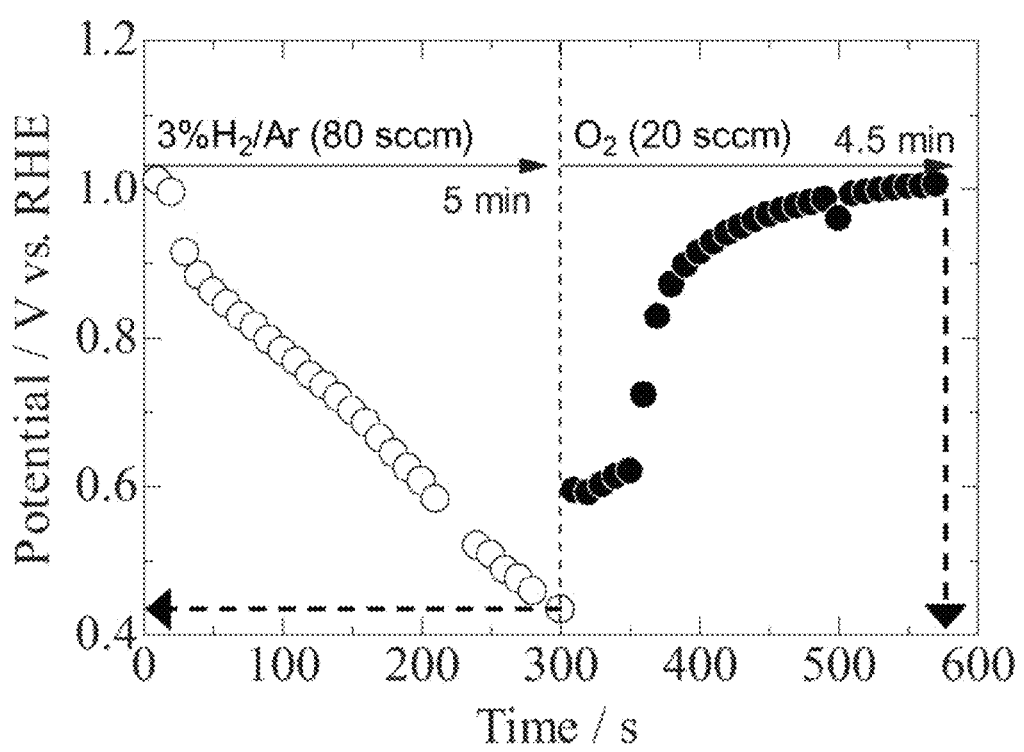
FIG. 8 is a graph showing the relationship between the time and the potential fluctuation during $H_2$ gas and $O_2$ gas bubbling.
Figure 9:
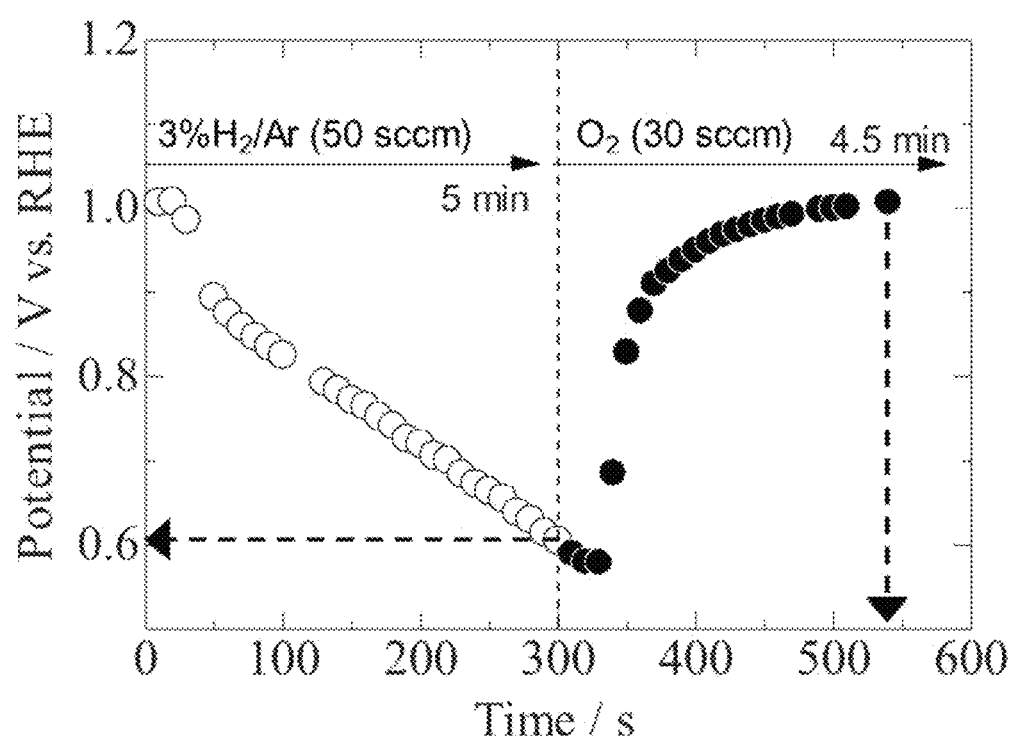
FIG. 9 is a graph showing the relationship between the time and the potential fluctuation during $H_2$ gas and $O_2$ gas bubbling.
Figure 10:
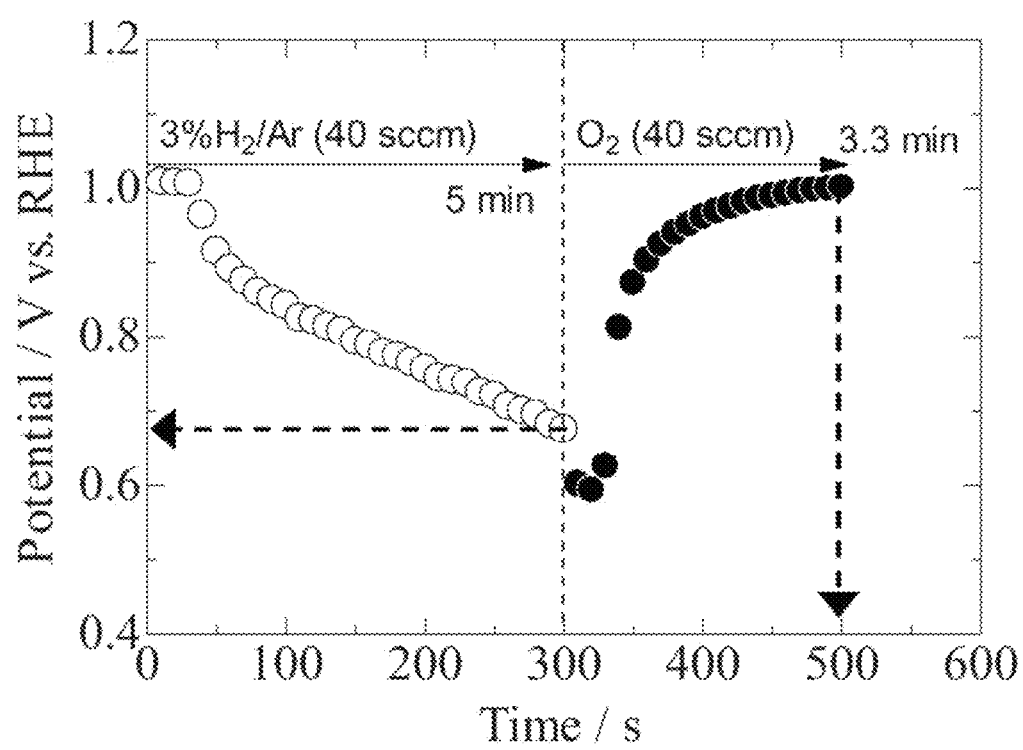
FIG. 10 is a graph showing the relationship between the time and the potential fluctuation during $H_2$ gas and $O_2$ gas bubbling.

FIGS. 8 to 10 illustrate a state of the potential fluctuation in a case where a gas supply amount is changed.

FIG. 8 illustrates a result of examining a time until the potential returns to 1.0 V since the cell is set in the same manner as in Experiment 2, a 3% hydrogen gas (Ar balance) is introduced at 80 sccm for 5 minutes, and then gas is switched to a 100% oxygen gas and introduced at 20 sccm. When the 3% hydrogen gas (Ar balance) was introduced at 80 sccm for 5 minutes, the potential shift changed from 1.00 V to 0.44 V. Thereafter, when the gas was switched to the 100% oxygen gas and introduced at 20 sccm, a time until the potential returned to 1.0 V, that is, until the potential shift changed from 0.44 V to 1.00 V was 4.5 minutes.

FIG. 9 illustrates a result of examining a time until the potential returns to 1.0 V since the cell is set in the same manner as in Experiment 2, the 3% hydrogen gas (Ar balance) is introduced at 50 sccm for 5 minutes, and then gas is switched to the 100% oxygen gas and introduced at 30 sccm. When the 3% hydrogen gas (Ar balance) was introduced at 50 sccm for 5 minutes, the potential shift changed from 1.00 V to 0.60 V. Thereafter, when the gas was switched to the 100% oxygen gas and introduced at 30 sccm, a time until the potential returned to 1.0 V, that is, until the potential shift changed from 0.60 V to 1.00 V was 4.5 minutes.

FIG. 10 illustrates a result of examining a time until the potential returns to 1.0 V since the cell is set in the same manner as in Experiment 2, the 3% hydrogen gas (Ar balance) is introduced at 40 sccm for 5 minutes, and then gas is switched to the 100% oxygen gas and introduced at 40 sccm. When the 3% hydrogen gas (Ar balance) was introduced at 40 sccm for 5 minutes, the potential shift changed from 1.00 V to 0.68 V. Thereafter, when the gas was switched to the 100% oxygen gas and introduced at 40 sccm, a time until the potential returned to 1.0 V, that is, until the potential shift changed from 0.68 V to 1.00 V was 3.3 minutes.

From the results of FIGS. 8 to 10, it was found that the lower the supply amount of the 3% hydrogen gas, the higher the reached potential. In addition, it was found that the speed of reaching 1.0 V increased as the supply amount of oxygen gas increased.

6. Consideration of Experiments 1 to 3

From the results of Experiments 1 to 3, it was confirmed that the open circuit potential of the Pt mesh could be controlled by partial pressure (gas concentration), the gas supply rate, and the gas supply amount.

7. Experiment 4 (Observation of Catalyst with Electron Microscope)

The catalyst before the open circuit potential control and the catalyst after the open circuit potential control were compared and examined.

Specifically, the experiment was performed as follows.

In the same manner as in Experiment 1, a 3% hydrogen gas (Ar balance) was introduced at 80 sccm for 3 minutes, and then a 100% oxygen gas was introduced at 20 sccm for 3 minutes. This alternate blowing was repeated 10 times. That is, the open circuit potential as illustrated in FIG. 6 was controlled by alternately blowing hydrogen gas (3 minutes) and oxygen gas (3 minutes), and, with the waveform illustrated in FIG. 6 as one cycle, the cycle was repeated 10 times. This processing may be referred to as "potential cycle treatment" in the present specification. The waveform illustrated in FIG. 6 has a low potential of 0.6 V and a high potential of 1.0 V based on the standard hydrogen electrode.

Figure 11:
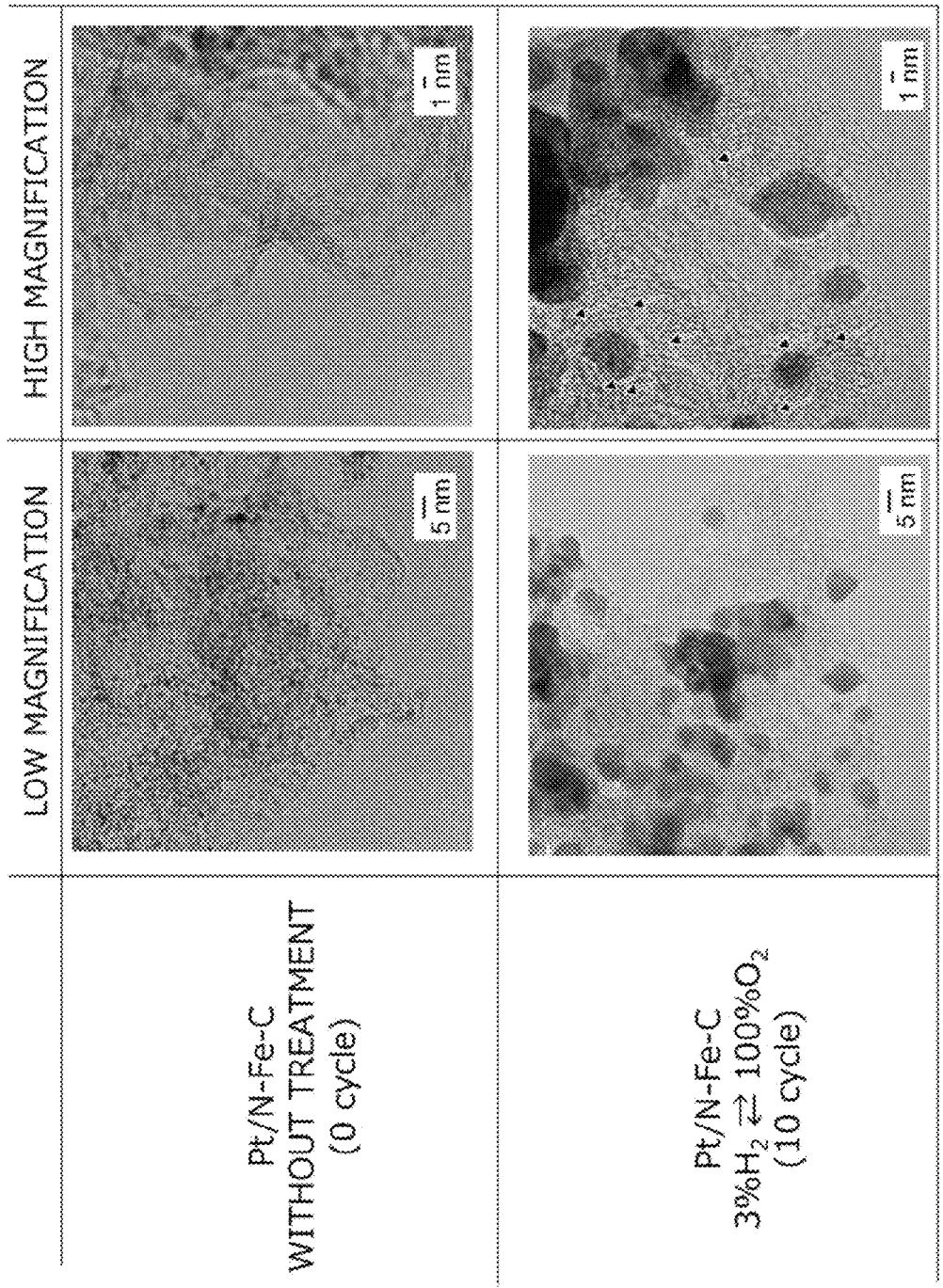
FIG. 11 is a TEM image of Pt/PMF (Pt/N—Fe—C) before and after potential cycle treatment.

FIG. 11 illustrates results of observing, with an electron microscope (TEM), a state of the catalyst before the potential cycle treatment is performed and a state of the catalyst after the potential cycle treatment is performed by charging the catalyst into the cell. It was found that Pt particles of about 1 nm were highly dispersed and supported before the potential cycle treatment (upper two photographs of FIG. 11). After ten cycles (lower two photographs of FIG. 11), the presence of coarsened and aggregated particles was conspicuous at a glance; however, the presence of many subnanoparticles of 1 nm or less was confirmed. Some of the observed subnanoparticles are indicated by arrows (←).

8. Experiment 5 (Evaluation of Catalytic Activity)

Figure 12:
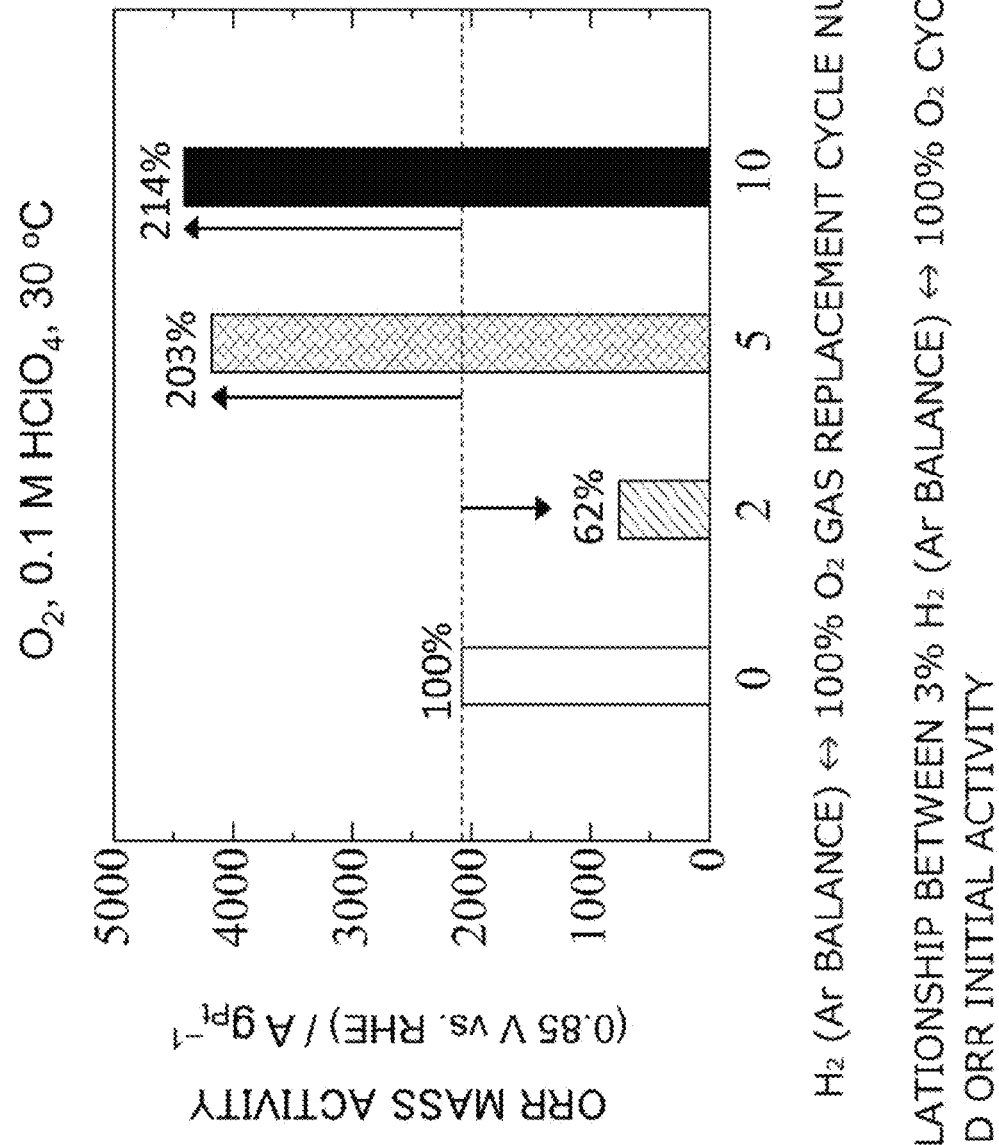
FIG. 12 is a graph showing a relationship between the number of cycles and ORR initial activity.

As described above, in the catalyst prepared in Experiment 4, coarsened particles and micronized subnanoparticles coexisted. In order to confirm whether excellent catalytic ability are exhibited even when coarsened particles and micronized subnanoparticles coexist as described above, catalytic activity of the catalyst before the potential cycle treatment (0 cycle) and the catalyst after ten cycle treatment observed in Experiment 4 was evaluated. The catalyst subjected to two cycle treatment and the catalyst subjected to five cycle treatment were also evaluated. Oxygen reduction reaction (ORR) activity of those catalysts was evaluated by a rotating disk electrode (RDE) method. ORR mass activity at 0.85 V is shown in comparison in FIG. 12. Although the catalyst subjected to the two cycle treatment had an activity value lower than that of the catalyst without treatment (0 cycle), the activity of the catalyst became higher than that of the catalyst without treatment (0 cycle) as the number of treatments increased to five and ten cycles, and it became twice or more. From this result, it could be seen that a contribution ratio of the activity of the subnanoparticles was very high even when coarsened particles coexisted. Since the activity decreased in two cycles, it was found that a formation ratio of the coarsened particles and the subnanoparticles could be controlled by the number of times of treatment and time.

9. Effects of Examples

According to Examples, a high-performance catalyst can be industrially mass-produced. This embodiment is expected to greatly contribute to the spread of fuel cells themselves, the spread of fuel cell vehicles using the fuel cells, and the acceleration of the spread of stationary cogeneration.

It is noted that the foregoing examples have been provided merely for the purpose of explanation and are in no way to be construed as limiting of the present disclosure. While the present disclosure has been described with reference to exemplary embodiments, it is understood that the words which have been used herein are words of description and illustration, rather than words of limitation. Changes may be made, within the scope of the appended claims, without departing from the scope and spirit of the present disclosure in its aspects. Although the present disclosure has been described herein with reference to particular structures, materials and embodiments, the present disclosure is not intended to be limited to the particulars disclosed herein; rather, the present disclosure extends to all functionally equivalent structures, methods and uses, which are within the scope of the appended claims.

The present disclosure is not limited to the embodiments described in detail above, and can be modified or changed in various manners within the scope as set forth in the claims.

The invention claimed is:
1. A method of producing a catalyst, comprising:
dispersing, in an acid solution, a composite in which a plurality of raw material microparticles containing a noble metal is supported on a carbon support doped with a nitrogen atom and a first transition metal atom;
immersing a noble metal member in the acid solution; and alternately blowing a first gas containing an oxidizing gas and a second gas containing a reducing gas into the acid solution.

2. The method of producing a catalyst according to claim 1, wherein the acid solution is stirred.

3. The method of producing a catalyst according to claim 1, wherein the oxidizing gas is at least one selected from the group consisting of $O_2$, $NO_x$ (x is an integer of 1 or more and 2 or less), $N_2O$, $CO_2$, and air.

4. The method of producing a catalyst according to claim 2, wherein the oxidizing gas is at least one selected from the group consisting of $O_2$, $NO_x$ (x is an integer of 1 or more and 2 or less), $N_2O$, $CO_2$, and air.

5. The method of producing a catalyst according to claim 1, wherein the reducing gas is at least one selected from the group consisting of hydrogen, ammonia, hydrocarbon, and CO.

6. The method of producing a catalyst according to claim 2, wherein the reducing gas is at least one selected from the group consisting of hydrogen, ammonia, hydrocarbon, and CO.

7. The method of producing a catalyst according to claim 1, wherein at least one of the raw material microparticles is dissolved and micronized, and nascent microparticles are generated on the carbon support from metal ions generated by the dissolution.

8. The method of producing a catalyst according to claim 2, wherein at least one of the raw material microparticles is dissolved and micronized, and nascent microparticles are generated on the carbon support from metal ions generated by the dissolution.

9. The method of producing a catalyst according to claim 3, wherein a potential cycle due to a fluctuation in an open circuit potential of the noble metal member is enabled, and
the open circuit potential is controlled by adjusting at least one or more selected from the group consisting of a concentration of the oxidizing gas in the first gas, a supply rate of the first gas, and a supply amount of the first gas per one cycle of the potential cycle.

10. The method of producing a catalyst according to claim 4, wherein a potential cycle due to a fluctuation in an open circuit potential of the noble metal member is enabled, and
the open circuit potential is controlled by adjusting at least one or more selected from the group consisting of a concentration of the oxidizing gas in the first gas, a supply rate of the first gas, and a supply amount of the first gas per one cycle of the potential cycle.

11. The method of producing a catalyst according to claim 5, wherein a potential cycle due to a fluctuation in an open circuit potential of the noble metal member is enabled, and
the open circuit potential is controlled by adjusting at least one or more selected from the group consisting of a concentration of the reducing gas in the second gas, a supply rate of the second gas, and a supply amount of the second gas per one cycle of the potential cycle.

12. The method of producing a catalyst according to claim 6, wherein a potential cycle due to a fluctuation in an open circuit potential of the noble metal member is enabled, and
the open circuit potential is controlled by adjusting at least one or more selected from the group consisting of a concentration of the reducing gas in the second gas, a supply rate of the second gas, and a supply amount of the second gas per one cycle of the potential cycle.

13. The method of producing a catalyst according to claim 1, including a potential cycle caused by repeating a fluctuation in an open circuit potential of the noble metal member between a potential of 0 V or more and 1.0 V or less based on a standard hydrogen electrode.

14. The method of producing a catalyst according to claim 2, including a potential cycle caused by repeating a fluctuation in an open circuit potential of the noble metal member between a potential of 0 V or more and 1.0 V or less based on a standard hydrogen electrode.

15. A catalyst produced by
dispersing, in an acid solution, a composite in which a plurality of raw material microparticles containing a noble metal is supported on a carbon support doped with a nitrogen atom and a first transition metal atom,
immersing a noble metal member in the acid solution, and
alternately blowing a first gas containing an oxidizing gas and a second gas containing a reducing gas into the acid solution.

16. A fuel cell comprising the catalyst according to claim 15.

* * * * *